US008593070B2

(12) United States Patent
Wang et al.

(10) Patent No.: US 8,593,070 B2
(45) Date of Patent: Nov. 26, 2013

(54) THREE-PHASE LED POWER SUPPLY

(75) Inventors: Jian Wang, ShangHai (CN); Hong Zhao, ShangHai (CN)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 13/128,936

(22) PCT Filed: Jul. 26, 2010

(86) PCT No.: PCT/US2010/043220

§ 371 (c)(1), (2), (4) Date: May 12, 2011

(87) PCT Pub. No.: WO2011/014450

PCT Pub. Date: Feb. 3, 2011

(65) Prior Publication Data

US 2011/0234106 A1 Sep. 29, 2011

(30) Foreign Application Priority Data

Jul. 29, 2009 (CN) .......................... 2009 1 0162218

(51) Int. Cl.

*H05B 37/00* (2006.01)
*H02M 7/00* (2006.01)

(52) U.S. Cl.

USPC ........... 315/224; 315/247; 315/251; 315/291; 363/125; 363/67; 363/44; 363/89; 363/126

(58) Field of Classification Search

USPC ............ 362/11, 184, 191; 315/185 R, 200 R, 315/246, 254, 276, 291, 297, 307, 312, 137, 315/139, 113, 72, 59; 363/13, 15, 34, 123, 363/125, 126, 129, 132

See application file for complete search history.

(56) References Cited

U.S. PATENT DOCUMENTS

| | | | | |
|---|---|---|---|---|
| 5,187,414 | A * | 2/1993 | Fellows et al. | 315/307 |
| 5,650,923 | A * | 7/1997 | Suzuki et al. | 363/126 |
| 6,411,045 | B1 | 6/2002 | Nerone | |
| 6,660,935 | B2 | 12/2003 | Southard et al. | |
| 6,942,361 | B1 | 9/2005 | Kishimura et al. | |
| 6,977,445 | B2 * | 12/2005 | Lubomirsky | 307/18 |
| 7,157,807 | B2 * | 1/2007 | Lubomirsky | 307/18 |
| 7,157,863 | B2 | 1/2007 | Eckert | |
| 7,161,306 | B2 | 1/2007 | Ravindra et al. | |
| 7,665,866 | B2 | 2/2010 | Mayer et al. | |
| 7,696,639 | B2 * | 4/2010 | Lubomirsky | 307/18 |
| 7,828,461 | B2 | 11/2010 | Mayer | |
| 2005/0057187 | A1 * | 3/2005 | Catalano | 315/291 |
| 2007/0090767 | A1 * | 4/2007 | Roberts | 315/139 |
| 2009/0021175 | A1 | 1/2009 | Wendt et al. | |

OTHER PUBLICATIONS

PCT/US2010/043220 International Search Report and Written Opinion.

* cited by examiner

*Primary Examiner* — Vibol Tan
(74) *Attorney, Agent, or Firm* — Fay Sharpe LLP

(57) ABSTRACT

A three phase rectifier rectifies received three phase a.c. power to generate a ripple d.e. voltage. A power distribution bus conveys distribution power comprising the ripple d.c. voltage or an a.c. voltage derived therefrom to a location of an LED based lamp that is distal from the three phase rectifier. Additional circuitry disposed with the LED based lamp drives the LED based lamp using the distribution power.

14 Claims, 5 Drawing Sheets

THREE-PHASE LED POWER SUPPLY

BACKGROUND

The following relates to the illumination arts, lighting arts, electrical power arts, and related arts.

Light emitting diode (LED)-based lamps are employed in diverse outdoor lighting and illumination systems, such as traffic lighting, overhead (e.g., post-mounted) lamps, billboard and other commercial illuminated signage, and so forth. These lighting or illumination systems are sometimes in the context of commercial or industrial applications, such as commercial signage, parking lot illumination for retail centers, malls, supermarkets, and the like, or so forth.

In commercial and industrial settings, the available electrical power is typically three-phase a.c. power, such as 120/208 V or 277/480 V three-phase power as is typical in commercial or industrial settings in the United States, or 220/380 V three phase power in China, or so forth. The three-phase power is typically high voltage (for example, over 100 volts per phase). For high operating efficiency, the powered load should be balanced amongst the three phases.

LED-based lamps, on the other hand, are typically driven by d.c. power, since the diodes have polarity and do not operate under "negative" bias. Light emitting diodes also typically operate at relatively low voltage (a few volts across the p/n junction) and at relatively high current (of order a few hundred milliamperes to a few amperes current flow through each diode). Thus, LED-based lamps are generally not well-matched to three-phase a.c. power.

In a known approach for driving an LED-based lamp using three-phase a.c. power, the lamp is driven by one phase of a Y-connected three-phase a.c. power source (i.e., between the phase and ground), or is driven across two phases of a Y- or Δ-connected a.c. power source. To balance the load, a plural number of such LED-based lamps are distributed in balanced fashion amongst the phases of the power source. The generally sinusoidal a.c. phase-to-ground or phase-to-phase voltage is converted to d.c. using a costly electrolytic capacitor as a filter. Still further, for efficient power usage a power factor (PF) correction circuit is employed to ensure the LED-based lamp is driven at a PF close to unity.

These approaches employ complex and costly circuitry. Additionally, these are nonstandard approaches for drawing power off the three-phase a.c. distribution bus. As a result, the electrical connection of an LED-based lamp typically requires performing substantial electrical work at the three-phase a.c. power distribution panel, such as installing one or more dedicated phase-to-ground or phase-to-phase power taps. Such extensive electrical work at the distribution panel is undesirable and can introduce substantial safety concerns.

Another consideration is the location of the power conversion system. In commercial or industrial settings, LED-based lamps are sometimes mounted in locations that are remote or difficult to access. Examples include post-mounted lamps, illuminated channel letter signage mounted on an elevated billboard or building wall, or so forth. Typically, underground conduits supply the a.c. power at ground level. In one approach, the power conversion circuitry is mounted proximate to the elevated lamp. This approach adversely impacts maintenance. If the power circuitry fails or needs repair, a crew of typically three persons (an electrician, an lift operator, and a third "safety spotter") are required to perform the maintenance at the location of the elevated lamp. In another approach, the power conversion circuitry is located at ground level. However, this approach has the disadvantage of requiring low voltage, high current d.c. electrical power to be conducted from ground level to the elevated location of the lamp, which increases "$I^2R$" resistive power losses. Additionally, this approach may entail adding a dedicated weatherproof housing at ground level to house the specialized power conversion circuitry for the LED-based lamp.

BRIEF SUMMARY

In some embodiments disclosed herein as illustrative examples, an apparatus comprises: a three phase rectifier configured to rectify received three phase a.c. power to generate a ripple d.c. voltage; and a d.c.-to-d.c. converter configured to convert the ripple d.c. voltage to a regulated d.c power.

In some embodiments disclosed herein as illustrative examples, a method comprises: at a first location, performing three phase rectification of received three phase a.c. power to generate a ripple d.c. voltage; and, at a second location, performing d.c.-to-d.c. conversion to generate regulated d.c power from the ripple d.c. voltage.

In some embodiments disclosed herein as illustrative examples, an apparatus comprises: a three phase rectifier configured to rectify received three phase a.c. power to generate a ripple d.c. voltage; a power distribution bus configured to convey distribution power comprising the ripple d.c. voltage or an a.c. voltage derived therefrom to a location of an LED based lamp that is distal from the three phase rectifier; and additional circuitry disposed with the LED based lamp and configured to drive the LED based lamp using the distribution power.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF PREFERRED EMBODIMENTS

Figure 1:
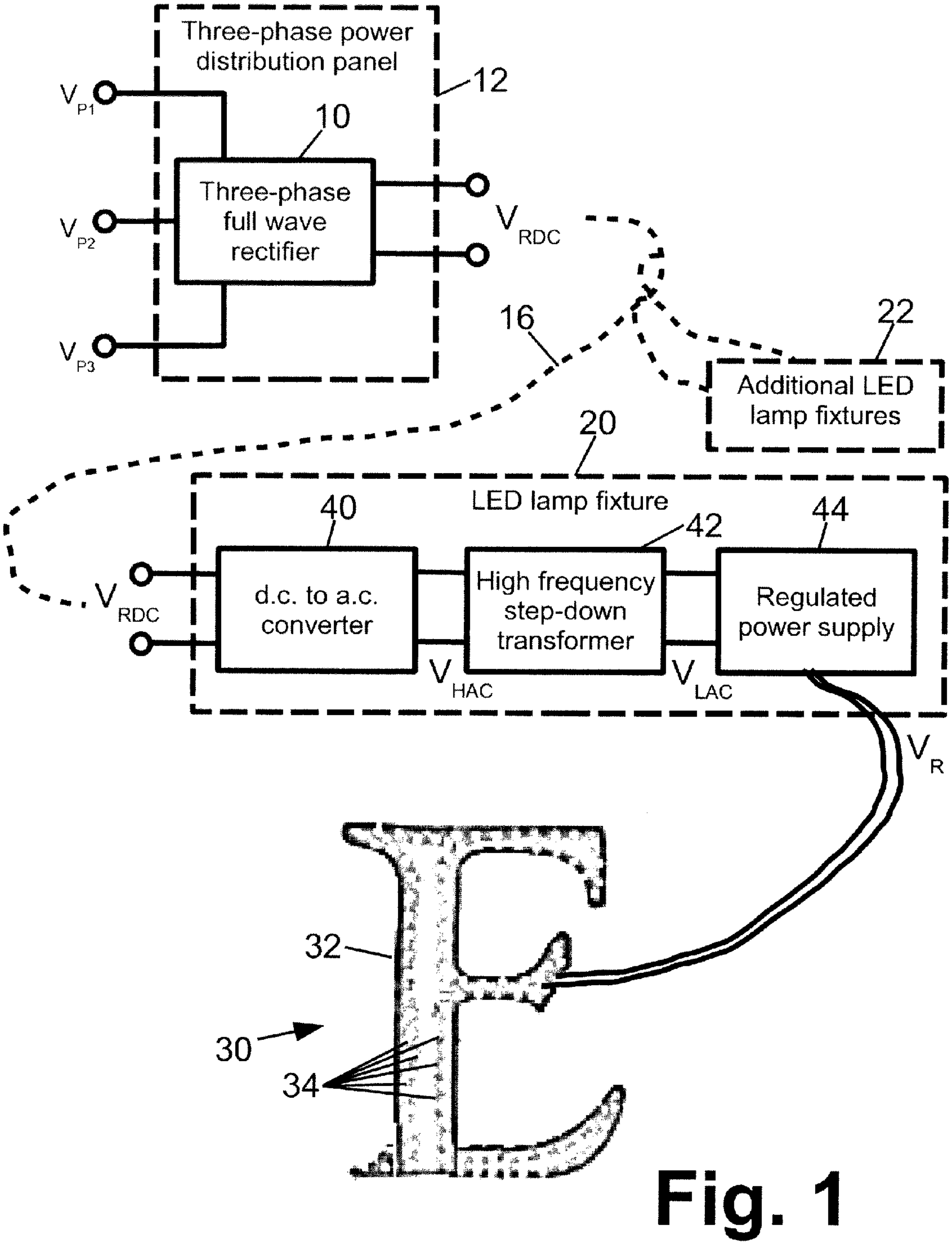
FIG. 1 diagrammatically illustrates an apparatus including an LED-based lamp and a power supply apparatus for converting three-phase a.c. power to drive the LED-based lamp.
Figure 2:
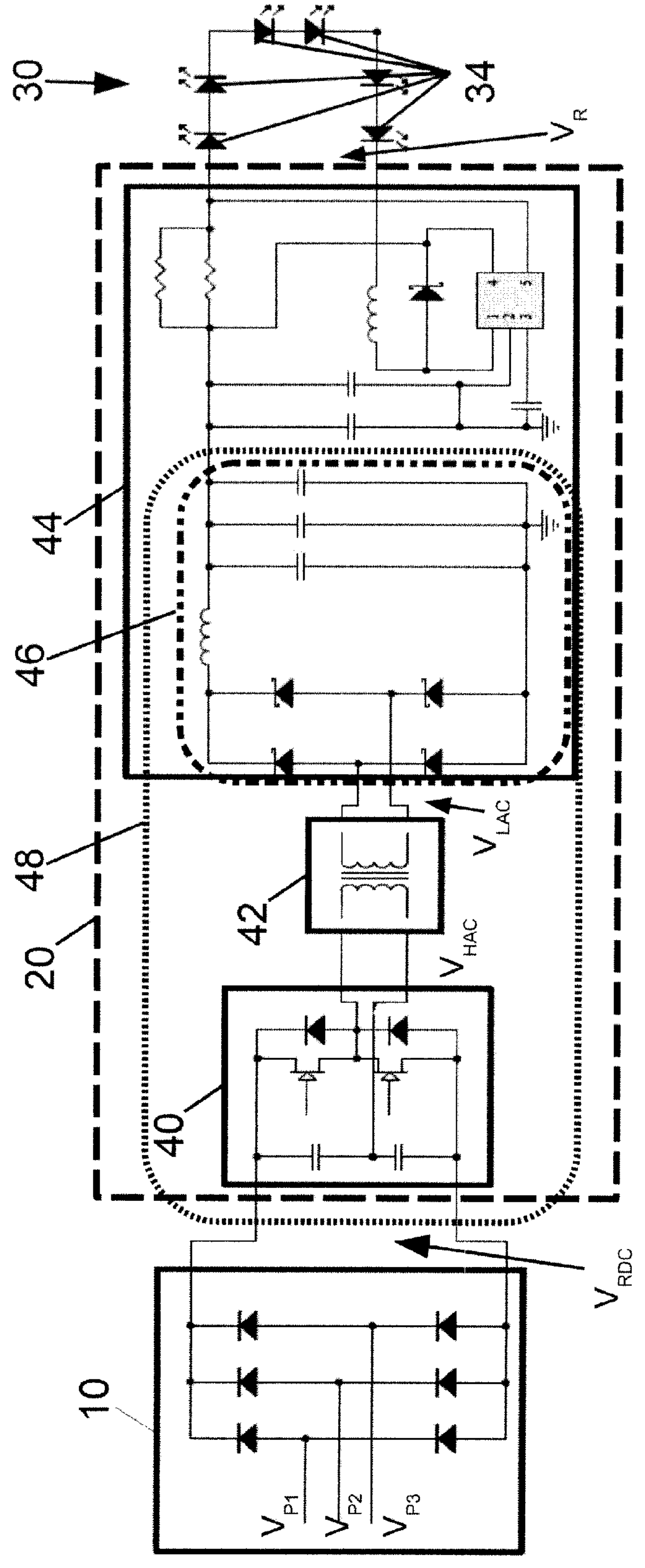
FIG. 2 diagrammatically shows the power supply apparatus in additional detail including illustrative examples of suitable electrical circuitry.
Figure 3:
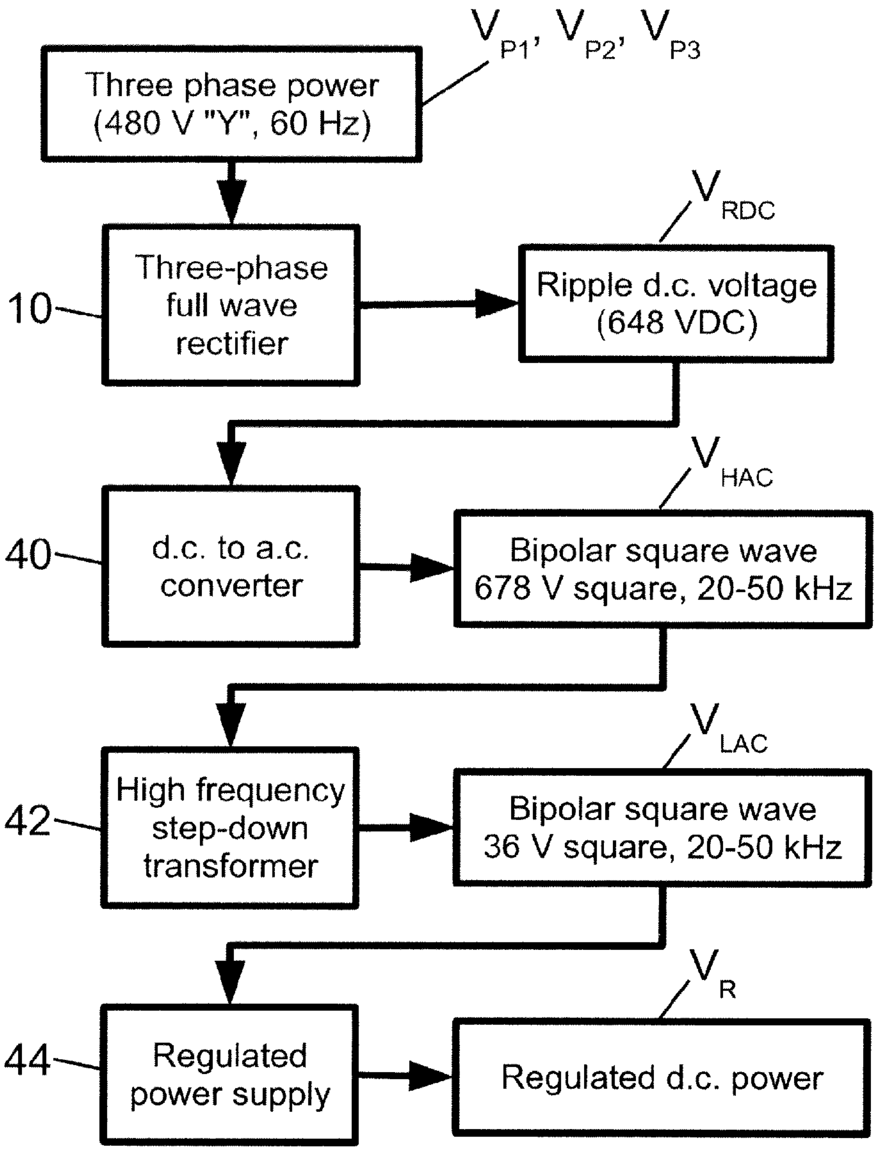
FIG. 3 diagrammatically shows an illustrative quantitative example of the power supply apparatus of FIG. 1.
Figure 4:
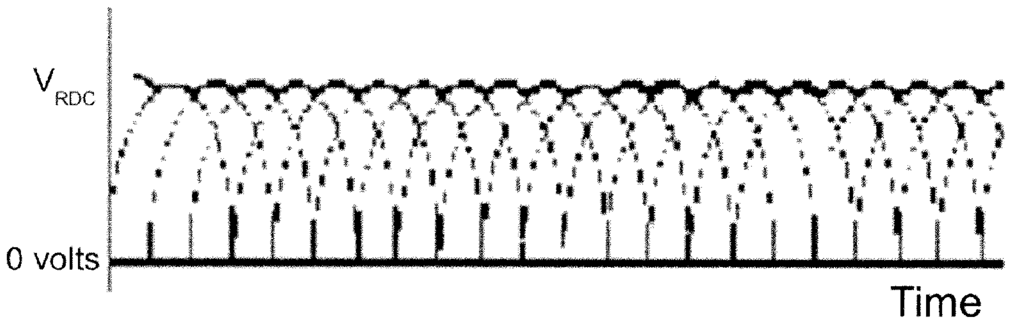
FIG. 4 plots the ripple d.c. voltage output by the three-phase full wave rectifier of the power supply apparatus of FIGS. 1 and 2.
Figure 5:
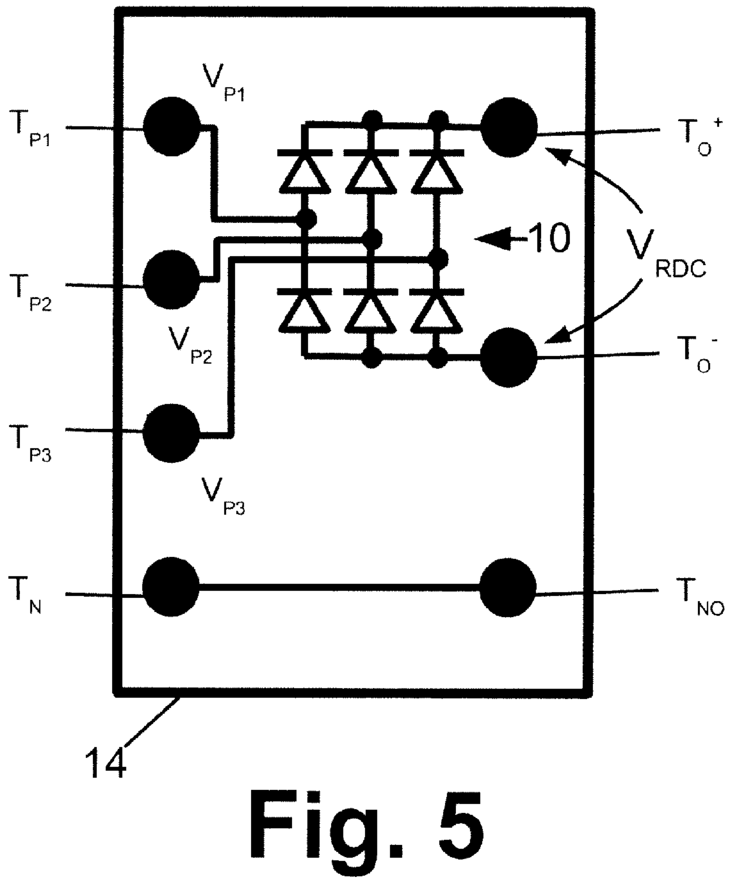
FIG. 5 diagrammatically illustrates an embodiment of the three-phase full wave rectifier of the power supply apparatus of FIGS. 1 and 2 in which the three-phase full wave rectifier is disposed in or on a terminal block configured for mounting in a three phase power distribution panel.

With reference to FIGS. 1-5, an apparatus includes a three-phase full-wave rectifier 10 which in the illustrated embodiment of FIG. 1 is disposed in a three-phase power distribution panel 12. The three-phase full-wave rectifier 10 receives three-phase a.c. power including phases $V_{P1}$, $V_{P2}$, $V_{P3}$ and outputs a ripple d.c. voltage $V_{RDC}$. The phases $V_{P1}$, $V_{P2}$, $V_{P3}$ may, for example, be phase-to-neutral or phase-to-phase a.c.

voltages of a wye ("Y") connected three-phase power configuration or of a delta ("Δ") connected three-phase power configuration. As shown in FIG. 5, the three phases $V_{P1}$, $V_{P2}$, $V_{P3}$ are input via corresponding three terminals $T_{P1}$, $T_{P2}$, $T_{P3}$ of a terminal block 14 configured for installation in the three-phase a.c. power distribution panel 12, while the ripple d.c. voltage $V_{RDC}$ is output across terminals $T_o^+$, $T_o^-$. The illustrated terminal block 14 also includes an optional neutral path having an input terminal $T_N$ connected with the electrical neutral or ground of the three-phase a.c. power feeding directly to an output terminal $T_{NO}$. This provides an electrical neutral or ground at the output if needed to comply with electrical safety considerations. The terminal block 14 advantageously can be configured as a conventional terminal block that is conventionally used in the three-phase a.c. power distribution panel 12, so that no special wiring or other configuration is needed to install the three-phase full-wave rectifier 10. With continuing reference to FIG. 5 (and as also shown in FIG. 2), the three-phase full-wave rectifier 10 is suitably embodied by three sets of power diode pairs. One power diode pair provides a first-polarity connection between the phase $V_{P1}$ and the first or positive terminal $T_o^+$ and a second-(opposite) polarity connection between the phase $V_{P1}$ and the second or negative terminal $T_o^-$. One power diode pair provides a first-polarity connection between the phase $V_{P2}$ and the positive terminal $T_o^+$ and an opposite polarity connection between the phase $V_{P2}$ and the negative terminal $T_o^-$. One power diode pair provides a first-polarity connection between the phase $V_{P3}$ and the positive terminal $T_o^+$ and an opposite polarity connection between the phase $V_{P3}$ and the negative terminal $T_o^-$. FIG. 4 shows the resulting ripple d.c. voltage $V_{RDC}$ across the terminals $T_o^+$, $T_o^-$. Each power diode pair performs full-wave rectification of the connected phase. The three full-wave rectified phase voltages are shown by dotted lines in FIG. 4, with the three full-wave rectified phase voltages superimposed across the terminals $T_o^+$, $T_o^-$ defining the ripple d.c. voltage $V_{RDC}$ across the terminals $T_o^+$, $T_o^-$. The ripple d.c. voltage $V_{RDC}$ typically has a ripple of about 10% of the average d.c. value, although the precise ripple depends on various factors such as harmonic distortion of the phases. The ripple d.c. voltage $V_{RDC}$ is a high-voltage signal. For example, FIG. 3 provides illustrative quantitative values for input three-phase a.c. power of 480 volts, "Y" connected at 60 Hz, such as is typical of some commercial and industrial three-phase a.c. power in the United States. The output of the three-phase full wave rectifier 10 for this input (neglecting harmonic distortion or the like) is a ripple d.c. voltage of about 648 volts, with a ripple of typically a few tens of volts.

With continuing reference to FIGS. 1-5, in some embodiments the ripple d.c. voltage $V_{RDC}$ is suitably distributed via a power distribution bus 16 (shown diagrammatically in phantom) to power LED-based lamps. In FIG. 1, an illustrative LED lamp fixture 20 driven by the ripple d.c. voltage $V_{RDC}$ is illustrated with some components diagrammatically illustrated, while additional LED lamp fixtures 22 are diagrammatically indicated in phantom. The fixture 20 includes components suitable to convert the ripple d.c. voltage $V_{RDC}$ to a regulated lower-voltage d.c. power suitable to operate an LED-based lamp 30, which in the embodiment shown in FIG. 1 is a portion of illuminated signage which in this illustrated example is a channel letter 32 having the shape of the letter "E" of the Latin alphabet illuminated by LEDs 34. Some illustrative examples of channel letter signage illuminated by LEDs are described, for example, in International Publication WO 02/097770 A2 published 5 Dec. 2002.

More generally, as used herein the term "LED-based lamp" and similar phraseology is intended to encompass any light source that employs one or more light emitting diodes (LEDs) for a lighting purpose such as general illumination, architectural accent illumination, illuminated signage, or so forth. The term "light emitting diode" or "LED" or similar phraseology as used herein denotes a compact solid-state light emitting device that generates illumination responsive to input d.c. power of relatively low voltage (e.g., a few volts) and relatively high current per LED device. The term "light emitting diode" or "LED" as used herein encompasses semiconductor-based LEDs (optionally including integral phosphor), organic LEDs (sometimes represented in the art by the acronym OLED), semiconductor laser diodes, or so forth. The terms "light emitting diode" or "LED" as used herein does not encompass devices such as incandescent light bulbs, fluorescent light tubes or compact fluorescent lamp (CFL) devices, halogen bulbs, or so forth that incorporate an evacuated volume or a fluid (that is, gaseous or liquid) component or that operate at high voltage per device, e.g. tens or hundreds of volts per device in the case of incandescent or fluorescent devices.

With continuing reference to FIGS. 1-3, the illustrative LED lamp fixture 20 includes a d.c.-to-a.c. converter 40 that converts the ripple d.c. voltage $V_{RDC}$ to an a.c. voltage $V_{HAC}$. In the illustrative example of FIG. 2, the d.c.-to-a.c. converter 40 is embodied by a half bridge converter defined by power diodes switched by control transistors driven by a suitable oscillator or the like (not shown). In some embodiments, the switching frequency of the half bridge converter is around 20-50 kHz, although higher or lower switching frequencies are also contemplated. The illustrative half bridge converter chops the ripple d.c. voltage $V_{RDC}$ into a square wave voltage that defines the a.c. voltage $V_{HAC}$ in this illustrative embodiment. An optional high-frequency step-down transformer 42 transforms the a.c. voltage $V_{HAC}$ to a.c. voltage $V_{LAC}$ at a lower voltage. In the illustrative quantitative example of FIG. 3, the d.c.-to-a.c. converter 40 is a half bridge converter that chops the 648 V (RMS) ripple d.c. voltage $V_{RDC}$ to a.c. voltage $V_{HAC}$ in the form of a square wave voltage having amplitude 678 V (bipolar, that is, switching between +678 V and −678 V as the square wave voltage switches between positive and negative polarities) and a frequency in the range 20-50 kHz. This square wave voltage is then reduced to the a.c. voltage $V_{LAC.}$ at a lower voltage of 36 V in the quantitative example of FIG. 3, by the optional high-frequency step-down transformer 42.

With continuing reference to FIGS. 1-3, the illustrative LED lamp fixture 20 further includes a regulated power supply 44 that is driven by the a.c. voltage $V_{HAC}$ output by the d.c.-to-a.c. converter 40 or that is driven by the lower voltage a.c. voltage $V_{LAC}$ output by the optional high-frequency step-down transformer 42. In the illustrative example of FIG. 2, the regulated power supply 44 is a switched-mode power supply; however, other regulated power supply topologies such as a linear regulator topology are also contemplated. The regulated power supply 44 outputs a regulated d.c. power $V_R$ suitable for driving the LED-based lamp 30. The illustrative switched-mode power supply shown in FIG. 2 includes a full-wave rectifier defined by a four-diode combination that generates full-wave rectified voltage that is smoothed by reactive filtering components and drives an operational amplifier (op-amp) or hysteresis based current-regulating switching circuit. The regulated d.c. power $V_R$ output by the switched-mode power supply of FIG. 2 is regulated with respect to current—in other words, the power regulation is constant current regulation which ensures that the output power is at a selected constant current level (within tolerances of the power regulation design). The selected constant current level for the regulated d.c. power $V_R$ is selected to provide suitable current to operate the LED-based lamp 30. Alternatively, employing a regulated power supply outputting a regulated voltage is also contemplated, in which case the regulation ensures that the output voltage is at a selected constant voltage level (again, within tolerances of the power regulation design).

The detailed circuitry of FIG. 2 is provided as an illustrative example. It is to be understood that the various components such as the d.c.-to-a.c. converter 40 and the regulated power supply 44 can be implemented in other ways, such as using various switched-mode or linear power regulation topologies for the regulated power supply 44, various chopping circuits for the d.c.-to-a.c. converter 40, or so forth. The a.c. voltage $V_{HAC}$ can have a waveform other than the illustrative bipolar square wave generated by the illustrative d.c.-to-a.c. converter 40, such as a sinusoidal or triangle wave form. It is also contemplated to include filtering components to reduce the ripple of the ripple d.c. voltage $V_{RDC}$.

The circuitry can also be viewed in a different way. As indicated in FIG. 2, the d.c.-to-a.c. converter 40, the high frequency step-down transformer 42, and the rectifier bridge component 46 of the regulated power supply 44 can be collectively considered as a d.c.-to-d.c. converter 48. The illustrated d.c.-to-d.c. converter 48 employs the d.c.-to-a.c. converter 40 which is embodied in the illustrated embodiment as a half bridge converter. However, other d.c.-to-d.c. converter topologies are also contemplated, such as a forward d.c.-to-d.c. converter topology, a flyback d.c.-to-d.c. converter topology, or so forth. In the forward and flyback topologies, there is no d.c.-to-a.c. converter component. Regardless of the d.c.-to-d.c. converter topology that is chosen, the purpose of the d.c.-to-d.c. converter 48 is to take the ripple d.c. voltage $V_{RDC}$ from the three-phase full-wave rectifier 10 and generate a lower-voltage rectified d.c. voltage. The portion of the regulated power supply 44 electrically downstream of the rectifier bridge component 46 provides smoothing or other conditioning of the converted d.c. voltage to generate the regulated d.c. power $V_R$ suitable for driving the LED-based lamp 30.

In some preferred embodiments, however, the apparatus does not include an electrolytic filter capacitor configured to perform or contribute to performing an a.c.-to-d.c. conversion. This preferred omission reduces manufacturing cost and weight of the power conversion apparatus, and improves the reliability of the system. It is contemplated, however, to use electrolytic capacitors elsewhere in the power conversion apparatus. For example, the one, some, or all of the capacitors of the circuitry shown in FIG. 2 can be embodied by electrolytic capacitors.

An advantage of the system of FIG. 1 is that the load imposed by the LED-based lamp 30 is inherently balanced, since the three-phase full wave rectifier 10 operates symmetrically and equally on the three phases $V_{P1}$, $V_{P2}$, $V_{P3}$ in generating the ripple d.c. voltage $V_{RDC}$. The system of FIG. 1 also advantageously does not employ a power factor (PF) correction circuit, but nonetheless provides a load that has a approximately unity power factor. The illustrated three-phase rectifier 10 is a full wave rectifier. It is contemplated to substitute a three-phase half wave rectifier for the illustrated three phase full wave rectifier 10. A three-phase half wave rectifier also provides the advantage of an inherently balanced load.

Another advantage of the system of FIG. 1 is that the three-phase a.c. power distribution panel 12 can be of a conventional configuration, and tapping off of the three-phase a.c. power distribution panel 12 to power the LED-based lamp 30 entails installation of the terminal block 14 which, as illustrated in. FIG. 5, can be configured for installation in a conventional three-phase a.c. power distribution panel. The arrangement of FIG. 1 includes the power distribution bus 16 which distributes the ripple d.c. voltage $V_{RDC}$. For some applications, it may be preferable to instead distribute the high voltage a.c. power $V_{HAC}$ that is output by the d.c.-to-a.c. converter 40, since this facilitates the use of transformer action for electrical isolation or other purposes while still providing a high voltage so as to reduce "$I^2R$" resistive power losses over long transmission lines.

Figure 6:
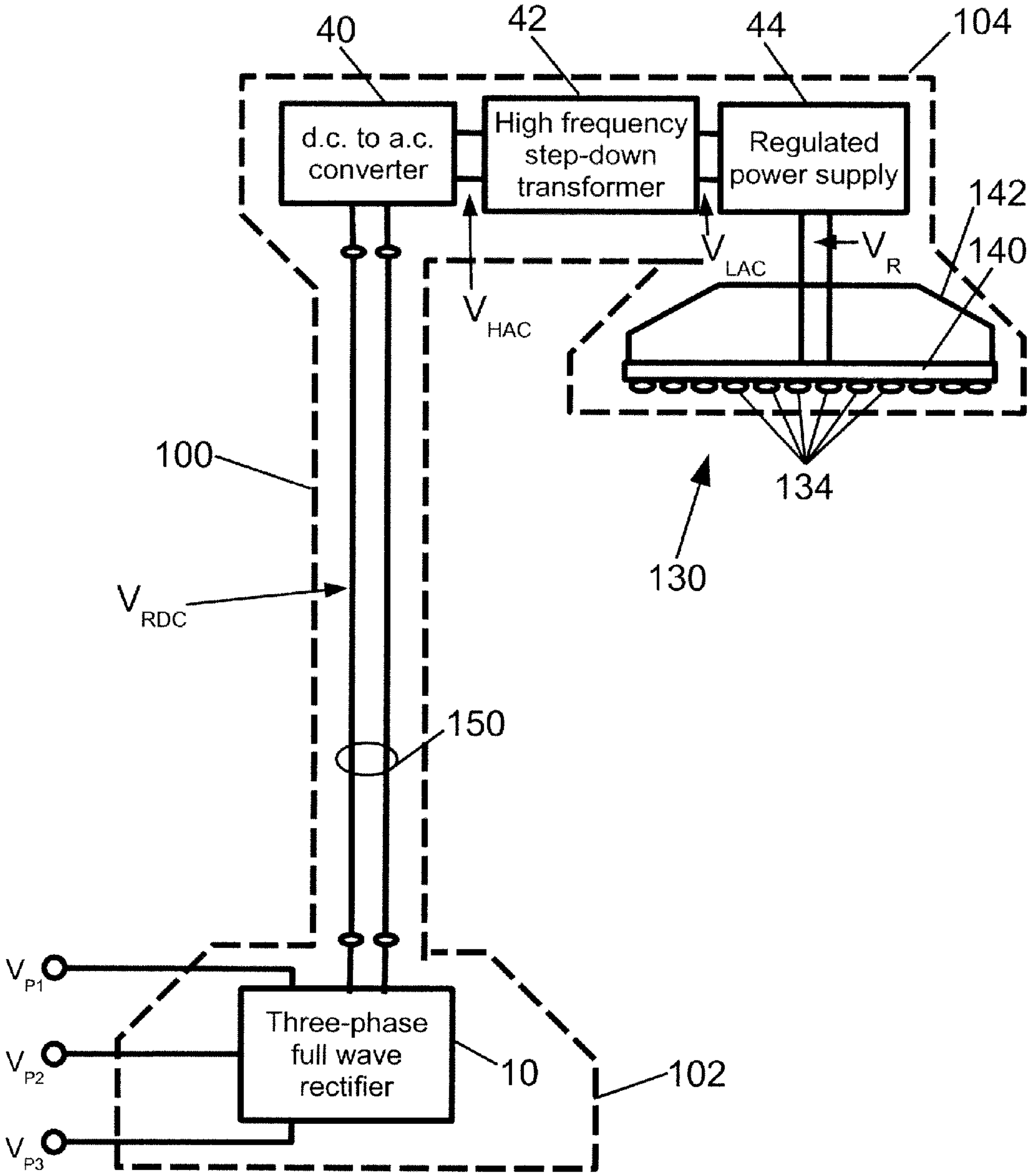
FIG. 6 diagrammatically illustrates an apparatus including a post-mounted LED-based lamp and a power supply fixture for driving the post-mounted LED-based lamp.

With reference to FIG. 6, another illustrative application is shown which employs transmission of the high voltage a.c. power $V_{HAC}$. The application of FIG. 6 is overhead lighting such as is typically used for illuminating parking lots, roadways, walkways, or so forth. In this application, a post 100 is held generally upright by a base 102 and includes an upper housing or assembly 104 that supports or integrally includes an LED-based lamp 130 held in an elevated position respective to ground level by the post 100. The post 100, base 102, and upper housing or assembly 104 collectively define a lamppost assembly 100, 102, 104. The illustrative elevated LED-based lamp 130 is configured as a downlight in which LEDs 134 are mounted on a substrate 140 in an arrangement that provides illumination in a generally downward direction. Although the illustrated post 100 is held precisely vertical, some cant or tilt of the post 100 is contemplated, for example to cause the lamp to overhang the roadway or other illuminated area. Optionally, the LED-based lamp 130 may include suitably configured reflectors, reflective baffles, or the like (not shown) in order to optimize the downward illumination pattern. Some examples of such arrangements are described, for example, in International Publication WO 2009/012314 A1 published 22 Jan. 2009. The illustrative LED-based lamp 130 also includes a heat sink 142 for dissipating heat generated by the LEDs 134, and may optionally include other operative components such as an ambient light sensor (not shown) for controlling operation of the lamp 130.

In the arrangement shown in FIG. 6, the three-phase full wave rectifier 10 is disposed in the base 102 of the lamppost assembly 100, 102, 104. The ripple d.c. voltage $V_{RDC}$ output by the d.c.-to-a.c. converter 40 is conducted up the post 100 by a cable 150 passing through a hollow conduit or interior of the post 100 to the d.c.-to-d.c. converter 48 (see FIG. 2) which in the illustrated embodiment includes the d.c.-to-a.c. converter 40, the high frequency step-down transformer 42, and the regulated power supply 44 all of which are located at the elevated position in the upper housing or assembly 104 that supports or integrally includes an LED-based lamp 130. Since the three-phase full wave rectifier 10 is disposed in the base 102 which is at ground level, repair or maintenance of this component 10 is simplified since a repair or maintenance person can access the three-phase full wave rectifier 10 without the use of a lift truck or the like. The three-phase full wave rectifier 10 is typically the most likely component to fail or require maintenance, since it operates at high a.c. voltage. On the other hand, the d.c.-to-d.c. converter in the elevated upper housing 104 is less prone to failure, and may in some embodiments be replaceable as a single modular unit. Accordingly, the arrangement of FIG. 6 advantageously balances equipment accessibility against operational efficiency and power transmission efficiency.

Moreover, as already noted with reference to FIGS. 1 and 5, the three-phase full wave rectifier 10 is optionally mounted in the three-phase a.c. power distribution panel, for example embodied as the terminal block 14 shown in FIG. 5, rather than in the lamp base 102 as shown in FIG. 6. In such an arrangement, a single terminal block 14 mounted in the three-phase a.c. power distribution panel can be used to generate the ripple d.c. voltage $V_{RDC}$ which is then distributed to the bases of a plurality of post-mounted lamps to drive the lamps.

Other divisions of components are also contemplated for use in various applications. For example, in the distribution system of FIG. 1, the d.c.-to-a.c. converter 40 is optionally integrated or included with the terminal block 14 shown in FIG. 5. In this alternative arrangement, the output terminals $T_o^+$, $T_o^-$ carry the high voltage a.c. power $V_{HAC}$ for power distribution, which in turn advantageously enables optional incorporation of transformer-based couplings into the power distribution bus 16. In some such embodiments it is contemplated to employ the high frequency step-down transformer 42 both for voltage step-down and also for tapping off of the power distribution bus 16. If the embodiment of FIG. 6 is modified in this way, then the high voltage a.c. power $V_{HAC}$ is conducted up the cable 150 passing through the post 100 to the post-mounted assembly including the electrical fixture and the post-mounted LED-based lamp 130. In such embodiments, the high voltage a.c. power $V_{HAC}$ is suitably distributed to the bases of a plurality of post-mounted lamps to drive the lamps.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:

at a ground level location, performing three-phase rectification of received three phase a.c. power to generate a ripple d.c. voltage; and at an elevated location above ground level, performing d.c.-to-d.c. conversion to generate regulated d.c power from the ripple d.c. voltage; and at the elevated location above ground level, driving a light emitting diode (LED)-based lamp to emit light using the generated regulated d.c. power.

2. The method as set forth in claim 1, wherein the elevated location is a fixture associated with the LED-based lamp.

3. The method as set forth in claim 2, wherein the ground level location is a three-phase a.c. power distribution panel.

4. The method as set forth in claim 1, wherein the performing d.c.-to-d.c. conversion comprises:

converting the ripple d.c. voltage to a first a.c. voltage; and step-down transforming the first a.c. voltage to a second a.c. voltage having reduced voltage compared with the first a.c. voltage, the regulated d.c power being generated from the second a.c. voltage.

5. An apparatus comprising:

a three-phase rectifier configured to rectify received three phase a.c. power to generate a ripple d.c. voltage;

a light emitting diode (LED)-based lamp disposed at an elevated position above the three-phase rectifier;

a power distribution bus configured to convey distribution power comprising the ripple d.c. voltage or an a.c. voltage derived therefrom to the elevated position of the LED-based lamp above the three-phase rectifier; and additional circuitry disposed with the LED-based lamp at the elevated position above the three-phase rectifier and configured to drive the LED-based lamp using the distribution power;

wherein the three-phase rectifier is disposed at ground level below the elevated position of the LED-based lamp and the additional circuitry, and the power distribution bus is configured to convey distribution power comprising the ripple d.c. voltage or a single-phase a.c. voltage derived therefrom from ground level to the elevated position.

6. The apparatus as set forth in claim 5, wherein the apparatus does not include an electrolytic filter capacitor configured to perform or contribute to performing an a.c.-to-d.c. conversion.

7. The apparatus as set forth in claim 5, wherein the three-phase rectifier is configured as a terminal block adapted for mounting on or in a three-phase a.c. power distribution panel.

8. The apparatus as set forth in claim 7, further comprising:

a fixture integral with or configured to operatively connect with an LED-based lamp, the additional circuitry being disposed on or in the fixture, the fixture not configured for installation in a three-phase a.c. power distribution panel.

9. The apparatus as set forth in claim 7, wherein the ripple d.c. voltage generated by the three-phase rectifier configured as a terminal block is conveyed as distribution power by the power distribution bus.

10. The apparatus as set forth in claim 5, wherein the additional circuitry disposed with the LED-based lamp and configured to drive the LED-based lamp using the distribution power comprises:

a d.c.-to-d.c. converter configured to convert power distribution power comprising the ripple d.c. voltage to regulated d.c. power configured to drive the LED-based lamp.

11. The apparatus as set forth in claim 10, wherein the d.c.-to-d.c. converter comprises:

a d.c.-to-a.c. converter configured to convert the ripple d.c. voltage to a first a.c. voltage;

a high-frequency step-down transformer configured to transform the first a.c. voltage to second a.c. voltage which is at a lower voltage; and a regulated power supply driven by the second a.c. voltage and configured to output the regulated d.c. power.

12. The apparatus as set forth in claim 11, wherein the d.c.-to-a.c. converter comprises:

a half bridge converter configured to chop the ripple d.c. voltage into a square wave voltage.

13. The apparatus as set forth in claim 5, further comprising:

a post on which the LED-based lamp is mounted at the elevated position; and a base at ground level connected with the post and holding the post upright.

14. The apparatus as set forth in claim 13, wherein the three-phase rectifier is disposed in the base.

* * * * *